(12) United States Patent
Luo

(10) Patent No.: US 11,131,372 B2
(45) Date of Patent: Sep. 28, 2021

(54) EQUIDIRECTIONAL TRANSFER UNIVERSAL TRANSMISSION

(71) Applicant: Can Luo, Kunming (CN)

(72) Inventor: Can Luo, Kunming (CN)

(*) Notice: Subject to any disclaimer, the term of this patent is extended or adjusted under 35 U.S.C. 154(b) by 0 days.

(21) Appl. No.: 17/051,131

(22) PCT Filed: May 24, 2019

(86) PCT No.: PCT/CN2019/088338
§ 371 (c)(1),
(2) Date: Oct. 27, 2020

(87) PCT Pub. No.: WO2019/228263
PCT Pub. Date: Dec. 5, 2019

(65) Prior Publication Data
US 2021/0231200 A1    Jul. 29, 2021

(30) Foreign Application Priority Data
May 28, 2018  (CN) .......................... 201810520479.X

(51) Int. Cl.
*F16H 37/04* (2006.01)
*F16H 37/08* (2006.01)
*F16H 48/10* (2012.01)

(52) U.S. Cl.
CPC ....... *F16H 37/046* (2013.01); *F16H 37/0826* (2013.01); *F16H 2048/106* (2013.01)

(58) Field of Classification Search
None
See application file for complete search history.

(56) References Cited

U.S. PATENT DOCUMENTS

| | | | | |
|---|---|---|---|---|
| 2,911,854 A | * | 11/1959 | Fabian | B60K 17/3467 475/204 |
| 5,415,595 A | * | 5/1995 | Nelson | F16H 35/008 475/221 |
| 7,410,436 B2 | * | 8/2008 | Van Druten | B60K 6/485 475/5 |

FOREIGN PATENT DOCUMENTS

| | | |
|---|---|---|
| CN | 87107664 A | 12/1988 |
| CN | 1109151 A | 9/1995 |

(Continued)

OTHER PUBLICATIONS

International Search Report (in English and in Chinese) and Written Opinion issued in PCT/CN2019/088338, dated Jul. 25 2019, 9 pages provided.

*Primary Examiner* — Colby M Hansen
(74) *Attorney, Agent, or Firm* — Hamre, Schumann, Mueller & Larson, P.C.

(57) ABSTRACT

The present invention relates to an equidirectional transfer universal transmission formed by connecting an equidirectional transfer case, a commutator, and an actuator. One of five types of planetary gear trains is used for the equidirectional transfer case, the component corresponding to a term having a maximum absolute value of a coefficient in a motion characteristic equation is used as an input end, and the other two components are respectively used as an inner output end and an outer output end. The commutator includes fourth types of quill shaft commutators and a non-quill shaft commutator, which are set by respective methods. One of two types of single-layer planetary gear trains is used for the actuator. The present invention includes methods for setting respective components of the equidirectional transfer case and the actuator, and includes a connection method. According to the present invention, an output shaft is controlled to revolve around an actuator shaft by (Continued)

inputting a revolving speed, a forward moment and a reverse moment are balanced during revolving, the output shaft has no unidirectional bearing moment, and a revolving control device has a simple structure.

13 Claims, 5 Drawing Sheets

(56) References Cited

FOREIGN PATENT DOCUMENTS

| | | |
|---|---|---|
| CN | 2616422 Y | 5/2004 |
| CN | 201246458 Y | 5/2009 |
| DE | 3726080 A1 | 2/1989 |

\* cited by examiner

EQUIDIRECTIONAL TRANSFER UNIVERSAL TRANSMISSION

TECHNICAL FIELD

The present invention relates to a transmission machine with a planetary gear train structure, and in particular to a universal transmission which is formed by connecting an equidirectional transfer case, a commutator and an actuator, and has the advantages that in the transmission process of a power rotation speed from an input end to an output end, an output shaft is controlled to revolve around an actuator shaft, and forward and reverse revolving control moments are balanced; and a revolving control device is simple.

BACKGROUND

Background knowledge of a planetary gear train: the planetary gear train includes three components, that is, two central gears and a planetary carrier with planetary gears. An arrangement and meshing structural relationship of the three components determines a motion characteristic equation of the planetary gear train and determines the type of the planetary gear train. The existing planetary gear trains are divided into cylindrical gear planetary gear trains and bevel gear planetary gear trains. The cylindrical gear planetary gear train includes a sun gear, an inner gear ring and the planetary carrier with planetary gears, wherein the sun gear, the inner gear ring and the planetary gears are all cylindrical gears. The cylindrical gear planetary gear trains are divided into single-layer planetary gear trains and double-layer planetary gear trains according to the number of layers, that is, one layer or two layers, of the planetary gears. In the single-layer planetary gear train, the sun gear is meshed with the planetary gears, and the planetary gears are meshed with the inner gear ring. In the double-layer planetary gear train, the sun gear is meshed with the inner layer of planetary gears, which is meshed with the outer layer of planetary gears, and the outer layer of planetary gears is meshed with the inner gear ring. The bevel gear planetary gear train includes two central gears and a planetary carrier with planetary gears. Generally, for the single-layer planetary gear train, one layer of planetary gears exists, and the two central gears and planetary gears thereof are bevel gears; and the left central gear is meshed with the planetary gears, and the planetary gears are meshed with the right central gear. Both the sun gear and the inner gear ring are the central gears. The sun gear is the left central gear, which is a central gear with a small pitch circle diameter, and the inner gear ring is the right central gear, which is a central gear with a large pitch circle diameter. The present invention proposes that all transmission machines including two central gears and the planetary carrier with planetary gears are planetary gear trains, one central gear is meshed with the planetary gears, multiple layers of planetary gears are meshed with one another or are directly connected, and the planetary gears are meshed with the other central gear. The planetary carrier, with the planetary gears thereon, rotates around axes of the central gears. The planetary gears perform both revolving and rotating, and the number of layers of the planetary gears may be one, two, or three. For example, the double-sun gear planetary gear train is a double-layer planetary gear train, which includes two central gears (sun gears) and the planetary carrier with planetary gears, wherein the two central gears and the planetary gears are all cylindrical gears, and each of the planetary gears is two coaxial gears, called the left planetary gear and the right planetary gear. The left planetary gear is meshed with the left central gear, the left planetary gear is directly connected to the right planetary gear, and the right planetary gear is meshed with the right central gear. A pitch circle diameter of the left central gear is not equal to a pitch circle diameter of the right central gear, and a gear module of the left central gear is unnecessarily equal to a gear module of the right central gear. For another example, the double-inner gear ring planetary gear train is a double-layer planetary gear train, which includes two central gears (inner gear rings) and a planetary carrier with planetary gears, wherein the two central gears and the planetary gears are all cylindrical gears, and each planetary gear is two coaxial gears, called the left planetary gear and the right planetary gear. The left planetary gear is meshed with the left central gear, the left planetary gear is directly connected to the right planetary gear, and the right planetary gear is meshed with the right central gear. The pitch circle diameter of the left central gear is not equal to the pitch circle diameter of the right central gear, and the gear module of the left central gear is unnecessarily equal to the gear module of the right central gear. For yet another example, the double-sun gear and double-planetary gear shaft planetary gear train is a single-layer planetary gear train, including two central gears (sun gears) and a planetary carrier with two planetary gear shafts and two layers of planetary gears, wherein the two central gears and the planetary gears are all cylindrical gears. The planetary carrier has an inner planetary gear shaft and an outer planetary gear shaft. The inner planetary gear shaft is provided with an inner planetary gear. Each planetary gear on the outer planetary gear shaft is two coaxial gears, called the left outer planetary gear and the right outer planetary gear. The left central gear is meshed with the inner planetary gear, the inner planetary gear is meshed with the left outer planetary gear, the left outer planetary gear and the right outer planetary gear are directly connected coaxially, and the right outer planetary gear is meshed with the right central gear. The gear module of the left central gear is unnecessarily equal to the gear module of the right central gear. For the three components of the planetary gear train, assuming that the left central gear is z, the planetary carrier is j, the right central gear is y, the left planetary gear or the left outer planetary gear is xz, the right planetary gear or the right outer planetary gear is xy, Zz is the number of teeth of the left central gear, Zy is the number of teeth of the right central gear, Zxz is the number of teeth of the left planetary gear or the left outer planetary gear, Zxy is the number of teeth of the right planetary gear or the right outer planetary gear, Nz is a rotation speed of the left central gear, Ny is a rotation speed of the right central gear, and Nj is a rotation speed of the planetary carrier. The characteristic parameters of the cylindrical gear planetary gear train and the bevel gear planetary gear train are a=Zy/Zz, and the characteristic parameter of the double-sun gear planetary gear train, the characteristic parameter of the double-inner gear ring planetary gear train and the characteristic parameter of the double-sun gear and double-planetary gear shaft planetary gear train are all a=(Zy*Zxz)/(Zz*Zxy). The motion characteristic equation of all single-layer planetary gear trains is: Nz+a*Ny=(1+a)*Nj, and the planetary gear trains conforming to the above motion characteristic equation are all single-layer planetary gear trains. In such a motion characteristic equation, the term having the maximum absolute value of a coefficient is Nj, and the component corresponding to this term is the planetary carrier. The motion characteristic equation of all double-layer planetary gear trains is: Nz−a*Ny=(1−a)*Nj, and the planetary gear trains conforming to the above motion characteristic equation are all double-layer planetary gear trains. When a<1.0, the term having the maximum absolute value of a coefficient in the motion characteristic equation is Nz, and the component corresponding to this term is the central gear marked as z on one side. When a>1.0, the term having the maximum absolute value of a coefficient in the motion characteristic equation is Ny, and the component corresponding to this term is the central gear marked as y on one side.

The transmission with an included angle between an input shaft and an output shaft is called turning transmission, the included angle is called a turning angle, and the transmission that the turning angle is kept constant while the output shaft revolves is called revolvable turning transmission. A traditional revolvable turning transmission is mainly a bevel gear turning transmission. A bevel gear pair is used to realize the turning transmission, the turning angle is fixed, and the output shaft is controlled to revolve around the input shaft as the turning transmission. A very large unidirectional bearing moment is formed on the output shaft during turning transmission. The unidirectional bearing moment is related to a power torque of the transmission. The greater the power torque is, the greater the unidirectional bearing moment is. The unidirectional bearing moment is related to the turning angle, and the greater the turning angle is, the greater the unidirectional bearing moment is. Due to the existence of the unidirectional bearing moment, when the traditional revolvable turning transmission controls the output shaft to revolve, the revolving control moments required for forward and reverse rotation are completely unbalanced. The device with a great moment, for example, a hydraulic device, is required to control the output shaft to revolve, or an additional balance device, for example, a reverse spring device, is required to provide a reverse moment to offset the unidirectional bearing moment, thereby controlling the output shaft to revolve. As a result, the structure of a revolving control device is very complex.

The equidirectional transfer universal transmission according to the present invention provides a structure of the universal transmission, and is a new type of revolvable turning transmission. When the output shaft is controlled to revolve around an actuator shaft during the transmission process of a power rotation speed from the input end to the output end, the forward and reverse revolving control moments are balanced, and thus the revolving control device has a simple structure. Such a revolvable turning transmission is called a universal transmission, and such transmission is called universal transmission.

SUMMARY

An equidirectional transfer universal transmission according to the present invention includes an equidirectional transfer case, a commutator and an actuator.

The equidirectional transfer case has an input end of the equidirectional transfer case, an inner output end of the equidirectional transfer case, and an outer output end of the equidirectional transfer case. The equidirectional transfer case converts a rotation speed of the input end thereof into two rotation speeds of the inner output end and outer output end thereof in the same rotation direction. The equidirectional transfer case adopts a planetary gear train, the number of gear groups of the planetary gears is one to six, one of the three components of the planetary gear train is disposed as the input end of the equidirectional transfer case, and the other two components are respectively used as the inner output end of the equidirectional transfer case and the outer output end of the equidirectional transfer case. The setting conditions are that when a power rotation speed is input from the input end of the equidirectional transfer case, the rotation directions of two rotation speeds output by the inner output end of the equidirectional transfer case and the outer output end of the equidirectional transfer case are the same. It may also be expressed as that for the planetary gear train of the equidirectional transfer case, the component corresponding to the term having the maximum absolute value of a coefficient in a motion characteristic equation thereof is used as the input end of the equidirectional transfer case, and the other two components are respectively used as the inner output end of the equidirectional transfer case and the outer output end of the equidirectional transfer case. The planetary gear train of the equidirectional transfer case adopts one of five types of planetary gear trains, wherein when a bevel gear single-layer planetary gear train is adopted, the component corresponding to the term having the maximum absolute value of the coefficient in the motion characteristic equation is a planetary carrier, the planetary carrier is used as the input end of the equidirectional transfer case, and a left central gear and a right central gear are respectively used as the inner output end of the equidirectional transfer case and the outer output end of the equidirectional transfer case. Referring to FIG. 5, in FIG. 5, the planetary carrier of the bevel gear single-layer planetary gear train is used as the input end (1) of the equidirectional transfer case, the left central gear is used as the inner output end (2) of the equidirectional transfer case, and the right central gear is used as the outer output end (3) of the equidirectional transfer case. When a double-sun gear and double-planetary gear shaft planetary gear train is adopted, the component corresponding to the term having the maximum absolute value of the coefficient in the motion characteristic equation is a planetary carrier, the planetary carrier is used as the input end of the equidirectional transfer case, and a left central gear and a right central gear are respectively used as the inner output end of the equidirectional transfer case and the outer output end of the equidirectional transfer case. Referring to FIG. 6, in FIG. 6, the planetary carrier of the double-sun gear and double-planetary gear shaft planetary gear train is used as the input end (1) of the equidirectional transfer case, the left central gear (4) is used as the inner output end (2) of the equidirectional transfer case, and the right central gear (5) is used as the outer output end (3) of the equidirectional transfer case. In FIG. 6, (6) denotes an inner planetary gear, (7) denotes a left outer planetary gear, and (8) denotes a right outer planetary gear. When a cylindrical gear double-layer planetary gear train is adopted, the component corresponding to the term having the maximum absolute value of the coefficient in the motion characteristic equation is a central gear (inner gear ring) with a large pitch circle diameter, the central gear (inner gear ring) with the large pitch circle diameter is used as the input end of the equidirectional transfer case, and a planetary carrier and a central gear (sun gear) with a small pitch circle diameter are respectively used as the inner output end of the equidirectional transfer case and the outer output end of the equidirectional transfer case. Referring to FIG. 7, in FIG. 7, the inner gear ring of the cylindrical gear double-layer planetary gear train is used as the input end (1) of the equidirectional transfer case, the planetary carrier is used as the inner output end (2) of the equidirectional transfer case, and the sun gear is used as the outer output end of the equidirectional transfer case (3). When a double-sun gear planetary gear train is adopted, the component corresponding to the term having the maximum absolute value of the coefficient in the motion characteristic equation is one central gear with a larger pitch circle diameter in two central gears, the central gear (sun gear) with the larger pitch circle diameter is used as the input end of the equidirectional transfer case, and a planetary carrier and the other central gear (sun gear) are respectively used as the inner output end of the equidirectional transfer case and the outer output end of the equidirectional transfer case. Referring to FIG. 8, in FIG. 8, the sun gear with the larger pitch circle diameter of the double-sun gear planetary gear train is used as the input end (1) of the equidirectional transfer case, the planetary carrier is used as the inner output end (2) of the equidirectional transfer case and the other sun gear is used as the outer output end (3) of the equidirectional transfer case. When a double-inner gear ring planetary gear train is adopted, the component corresponding to the term having the maximum absolute value of the coefficient in the motion characteristic equation is one central gear with a smaller pitch circle diameter in two central gears, the central gear (inner gear ring) with the smaller pitch circle diameter is used as the input end of the equidirectional transfer case, and the planetary carrier and the other central gear (inner gear ring) are respectively used as the inner output end of the equidirectional transfer case and the outer output end of the equidirectional transfer case. Referring to FIG. 9, in FIG. 9, the inner gear ring with the smaller pitch circle diameter of the double-inner gear ring planetary gear train is used as the input end (1) of the equidirectional transfer case, the planetary carrier is used as the inner output end (2) of the equidirectional transfer case, and the other inner gear ring is used as the outer output end (3) of the equidirectional transfer case.

The commutator includes a quill shaft commutator and a non-quill shaft commutator. The commutator includes two paths of transmission structures, the first-path transmission structure has a first input end and a first output end, and the second-path transmission structure has a second input end and a second output end. The commutator converts two rotation speeds of the first input end and second input end thereof in the same rotation direction into two rotation speeds of the first output end and second output end thereof in opposite rotation directions, and also converts two rotation speeds of the first output end and second output end thereof in the same rotation direction into two rotation speeds of the first input end and second input end thereof in opposite rotation directions. The quill shaft commutator includes an inner shaft and an outer shaft of a quill shaft, the inner shaft has an inner input end and an inner output end, and the outer shaft has an outer input end and an outer output end. The quill shaft commutator converts two rotation speeds of the inner input end and outer input end thereof in the same rotation direction into two rotation speeds of the inner output end and outer output end thereof in opposite rotation directions, and also converts two rotation speeds of the inner output end and outer output end thereof in the same rotation direction into two rotation speeds of the inner input end and outer input end thereof in opposite rotation directions. There are four types of quill shaft commutators: the first type is a bevel gear planetary gear train commutator, and the outer shaft adopts a bevel gear single-layer planetary gear train, referring to FIG. 10. In FIG. 10, the inner shaft of the quill shaft is provided with the inner input end (1) and the inner output end (2), which are directly connected. A left central gear and a right central gear of the bevel gear single-layer planetary gear train on the outer shaft of the quill shaft are used as the outer input end (2) of the commutator and the outer output end (4) of the commutator respectively, and bevel gear planetary gears (5) are meshed with the left central gear and the right central gear to fix a planetary carrier. The number of gear groups of the bevel gear planetary gears (5) of the planetary gear train may be one to six. The rotation directions of the outer input end (2) of the commutator and the outer output end (4) of the commutator are opposite. The second type is a double-sun gear and double-planetary gear shaft planetary gear train commutator, and the outer shaft adopts a double-sun gear and double-planetary gear shaft planetary gear train, referring to FIG. 11. In FIG. 11, the inner shaft of the quill shaft is provided with the inner input end (1) and the inner output end (3), which are directly connected. A left central gear and a right central gear of the double-sun gear and double-planetary gear shaft planetary gear train on the outer shaft of the quill shaft are used as the outer input end (2) of the commutator and the outer output end (4) of the commutator respectively to fix a planetary carrier. The number of gear groups of the inner planetary gears (5), the left outer planetary gears (6), and the right outer planetary gears (7) of the planetary gear train may be one to six. The rotation directions of the outer input end (1) of the commutator and the outer output end (3) of the commutator are opposite. The third type is a position-preserving two-way commutator, and each of the inner shaft and the outer shaft is driven by a bevel gear pair, referring to FIG. 12. In FIG. 12, the inner input end and outer input end of the position-preserving two-way commutator form an input quill shaft, and the inner output end and outer output end form an output quill shaft. An input quill shaft bearing and an output quill shaft bearing are fixed separately. The input quill shaft and the output quill shaft form an included angle of 90 degrees. An inner driving bevel gear is disposed on the inner input end (1), an outer driving bevel gear is disposed on the outer input end (2), an inner driven bevel gear (5) is disposed on the inner output end (3), and an outer driven bevel gear (6) is disposed on the outer output end (4), so that the inner driving bevel gear is meshed with the inner driven bevel gear (5), the outer driving bevel gear is meshed with the outer driven bevel gear (6), and a gear module of the inner driving bevel gear is not equal to a gear module of the outer driving bevel gear necessarily. If two rotation speeds in the same rotation direction are input on the inner input end and the outer input end, two rotation speeds in opposite rotation directions will be output on the inner output end and the outer output end. The fourth type is a position-changing two-way commutator, and each of the inner shaft and the outer shaft is driven by a bevel gear pair, referring to FIG. 13. In FIG. 13, the inner input end and the outer input end of the position-changing two-way commutator form an input quill shaft, the inner output end and the outer output end form an output quill shaft, and the input quill shaft and the output quill shaft form an included angle of 90 degrees. An inner driving bevel gear is disposed on the inner input end (1), an outer driving bevel gear is disposed on the outer input end (2), an inner driven bevel gear (5) is disposed on the inner output end (3), and an outer driven bevel gear (6) is disposed on the outer output end (4), so that the inner driving bevel gear is meshed with the outer driven bevel gear (6), the outer driving bevel gear is meshed with the inner driven bevel gear (5), and a gear module of the inner driving bevel gear is not equal to a gear module of the outer driving bevel gear necessarily. If two rotation speeds in the same rotation direction are input on the inner input end and the outer input end, two rotation speeds in opposite rotation directions will be output on the outer output end and the inner output end. In the present invention, for the bevel gear planetary gear train commutator and the double-sun gear and double-planetary gear shaft planetary gear train commutator, an inner shaft transmission ratio is set to 1.0, an outer shaft transmission ratio is set to −1.0, and a setting method is known in the art. For example: in the bevel gear planetary gear train commutator, the number of teeth of the left central gear=the number of teeth of the right central gear=the number of teeth of the bevel gear planetary gear. For the position-preserving two-way commutator, a transmission ratio from the inner input end to the inner output end is set to −1.0, and a transmission ratio from the outer input end to the outer output end is set to 1.0. The setting method is: for example, the number of teeth of the inner driving bevel gear=the number of teeth of the inner driven bevel gear, and the number of teeth of the outer driving bevel gear=the number of teeth of the outer driven bevel gear. For the position-changing two-way commutator, a transmission ratio from the inner input end to the outer output end is set to −1.0, and a transmission ratio from the outer input end to the inner output end is set to 1.0. The non-quill shaft commutator includes a left transmission and a right transmission, the left transmission has a left input end and a left output end, and the right transmission has a right input end and a right output end. The non-quill shaft commutator converts two rotation speeds of the left input end and right input end thereof in the same rotation direction into two rotation speeds of the left output end and right output end thereof in opposite rotation directions, and also converts two rotation speeds of the left output end and right output end thereof in the same rotation direction into two rotation speeds of the left input end and right input end thereof in opposite rotation directions. For example, referring to FIG. 16, a left input bevel gear (6) is the left input end of the commutator, a right input bevel gear (7) is the right input end of the commutator, the left transmission is subjected to transmission to the left output end of the commutator, i.e., a left output bevel gear (12) via a left steering bevel gear (8), and a left transmission bevel gear (10), and the right transmission is subjected to transmission to the right output end of the commutator, i.e., a right output bevel gear (13) via a right steering bevel gear (9) and a right transmission bevel gear (11). For the non-quill shaft commutator, a transmission ratio of the left transmission is set to be equal to the negative value of a transmission ratio of the right transmission.

The actuator is a transmission device synthesizing and converting two rotation speeds of an inner input end and an outer input end thereof in opposite rotation directions into a rotation speed of planetary gears thereof, and converts two rotation speeds of the inner input end and outer input end thereof in the same rotation direction into a rotation speed of a planetary carrier thereof. The actuator adopts a single-layer planetary gear train, the number of gear groups of the planetary gears is one to six, a planetary gear train shaft is an actuator shaft, a left central gear is used as the outer input end of the actuator, a right central gear is used as the inner input end of the actuator, the planetary carrier is used as a revolving control end, one to six planetary gears are used as an output end, an output shaft is gear shafts of these planetary gears, the output shaft and the actuator shaft form a turning angle, and the output end of the actuator is also the output end of the equidirectional transfer universal transmission. The actuator adopts one of two single-layer planetary gear trains. The first type is a bevel gear single-layer planetary gear train, referring to FIG. 14. In FIG. 14, the left central gear is used as the outer input end (2) of the actuator, the right central gear is used as the inner input end (1) of the actuator, the planetary carrier is used as the revolving control end (3), and one to six bevel gear planetary gears are used as the output end (4). The output shaft is gear shafts of these bevel gear planetary gears, and the output shaft and the actuator shaft form a turning angle of 90 degrees. The second type is a double-sun gear and double-planetary gear shaft planetary gear train, referring to FIG. 15. In FIG. 15, the left central gear is used as the outer input end (2) of the actuator, the right central gear is used as the inner input end of the actuator (1), the planetary carrier is used as the revolving control end, and one to six planetary gears are used as the output end (5). The output shaft is gear shafts of these planetary gears, and the output shaft and the actuator shaft are parallel to each other, i.e., form a turning angle of 0 degree. In FIG. 15, the output end is a right outer planetary gear. The outer connection of the revolving control end is for example: a worm gear (3) is disposed on the planetary carrier of the revolving control end, and a worm (4) meshed with the worm gear is disposed. Through the worm gear-worm device, a revolving speed may be input to the revolving control end, so that the planetary carrier revolves around the actuator shaft, and the output shaft also revolves around the actuator shaft.

A connection method according to the present invention is that the inner output end of the equidirectional transfer case is directly connected to the inner input end of the commutator, the outer output end of the equidirectional transfer case is directly connected to the outer input end of the commutator, the inner output end of the commutator is directly connected to the inner input end of the actuator, and the outer output end of the commutator is directly connected to the outer input end of the actuator. The input end of the equidirectional transfer case is connected to a power source to input a power rotation speed, the output end of the actuator is connected to a power use device, and the revolving control end is connected to a revolving control device. By inputting different revolving speeds to the revolving control end, the forward and reverse rotation of the component can be controlled, so that the output shaft revolves around the actuator shaft. When the commutator is the non-quill shaft commutator, the left input end of the commutator is equivalent to the inner input end of the above commutator, the right input end of the commutator is equivalent to the outer input end of the above commutator, the left output end of the commutator is equivalent to the inner output end of the above commutator and the right output end of the commutator is equivalent to the outer output end of the above commutator.

A method for setting respective components of the equidirectional transfer case and the actuator of the present invention is that a characteristic parameter is set to 0.8 to 1.25 when the equidirectional transfer case adopts the single-layer planetary gear train, the characteristic parameter is set to 1.6 to 2.5 when the equidirectional transfer case adopts the double-layer planetary gear train, and the characteristic parameter of the planetary gear train of the actuator is set to 0.8 to 1.25. In this way, the revolving control moments of the forward and reverse rotations of the output shaft around the actuator shaft are balanced approximately, and the input power rotation speed is nearly all converted into the power rotation speed of the output end of the actuator, and approaches and does not interfere with the revolving control rotation speed at which the output shaft is pushed to revolve around the actuator shaft. The optimal setting is that the characteristic parameter is equal to 1.0 when the equidirectional transfer case adopts the single-layer planetary gear train, the characteristic parameter is equal to 2.0 when the equidirectional transfer case adopts the double-layer planetary gear train, and the characteristic parameter of the planetary gear train of the actuator is equal to 1.0. In this way, the revolving control moments of the forward and reverse rotations of the output shaft around the actuator shaft are balanced, the input power rotation speed is all converted into the power rotation speed of the output end, and does not interfere with the revolving control rotation speed which is input by the revolving control end and at which the output shaft is pushed to revolve around the actuator shaft, and the output shaft has no unidirectional bearing moment. It is not necessary to use a revolving control device with a complex structure to overcome the unidirectional bearing moment, and the revolving control device has a simple structure. In the above setting methods, the characteristic parameters of the planetary gear train are expressed digitally. The characteristic parameters of the planetary gear train are essentially the expression of the number of teeth and structure settings of respective components of the equidirectional transfer universal transmission. For example, when the equidirectional transfer case adopts the bevel gear single-layer planetary gear train, the expression "the characteristic parameter is set to be equal to 1.0" means that the number of teeth of the left central gear is set to be equal to the number of teeth of the right central gear. Those in the art can understand that the setting of the characteristic parameters of respective planetary gear trains corresponds to the setting of the number of teeth and structures of respective planetary gear trains, which finally corresponds to the setting of the structure of the equidirectional transfer universal transmission.

The connection of the present invention includes direct connection and indirect connection. The direct connection enables the rotation speeds of respective components participating in the connection to be the same, and the indirect connection forms a fixed proportional relationship among rotation speeds of the respective components participating in the connection. The connection in the present invention means direct connection or indirect connection. The inner output end and the outer output end mean that these two components form a quill shaft, the inner output end is used as the inner shaft of the quill shaft, and the outer output end is used as the outer shaft of the quill shaft. The inner input end and the outer input end mean that these two components form a quill shaft, the inner input end is used as the inner shaft of the quill shaft, and the outer input end is used as the outer shaft of the quill shaft. Exceptions will be specifically pointed out. The power source is an engine such as a fuel engine or an electric engine, or a transmission device, such as a speed transmission or a speed reducer, behind the engine. The power source is connected to the input end of the equidirectional transfer case and may input the power rotation speed to the input end of the equidirectional transfer case. The revolving control device is an electric control device, a hydraulic control device or the like. The revolving control device is connected to the revolving control end and may input the revolving speed to the revolving control end. The power use device is a back-end device connected to the output end of the actuator, such as a rotor wing, double rotor wings, a propeller, double propellers, a wind wheel, a driving wheel and a drive shaft.

The equidirectional transfer universal transmission according to the present invention can be used for the universal transmission of a tiltable rotor wing of an aircraft, a direction-variable rotor wing of a helicopter, a direction-variable propeller of a ship and the like, the universal transmission across movable joints of a robot, the direction adjustment of a wind wheel axis by a wind driven generator, and the transmission of a driving wheel in the steering of a motor vehicle.

The equidirectional transfer universal transmission according to the present invention has the beneficial effects as follows: the equidirectional transfer universal transmission formed by connecting the equidirectional transfer case, the commutator, and actuator is proposed; the method for setting respective components is proposed; and during the transmission process of the power rotation speed, by inputting the revolving speed to the revolving control end, the output shaft is controlled to revolve around the actuator shaft, the forward and reverse revolving control moments are balanced, and the revolving control device has a simple structure.

Figure 1:
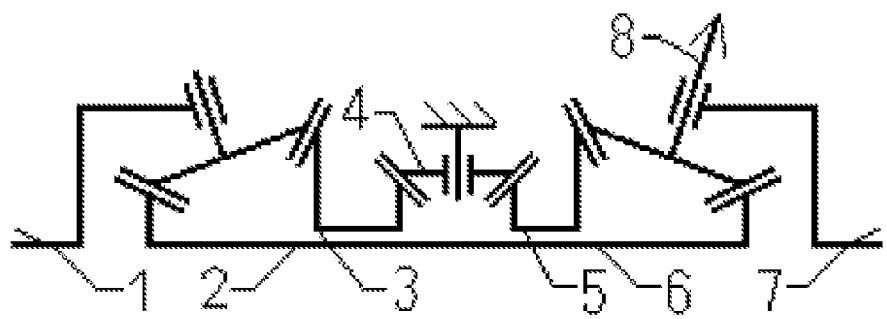
FIG. 1 is a schematic diagram of a first example of an equidirectional transfer universal transmission according to the present invention, is also a schematic diagram of Embodiment 1, and is a half schematic diagram. 1 denotes an input end of an equidirectional transfer case, 2 denotes an inner output end of the equidirectional transfer case, 3 denotes an outer output end of the equidirectional transfer case, 4 denotes a commutator, 5 denotes an outer input end of an actuator, 6 is an inner input end of the actuator, 7 denotes a revolving control end, and 8 denotes an output end of the actuator. In the drawing, the equidirectional transfer case adopts a bevel gear single-layer planetary gear train, the commutator is a bevel gear planetary gear train commutator, and the actuator adopts a bevel gear single-layer planetary gear train.

In accordance with the practice in the art, respective planetary gear trains in the drawings are shown in a half schematic diagram as far as possible, and the drawings only show a structural relationship of respective components, without reflecting true sizes.

DESCRIPTION OF EMBODIMENTS

Embodiment 1: a first example of an equidirectional transfer universal transmission according to the present invention is formed by connecting an equidirectional transfer case, a commutator and an actuator, and the equidirectional transfer case adopts a bevel gear single-layer planetary gear train, a bevel gear planetary gear train commutator is adopted, and the actuator adopts a bevel gear single-layer planetary gear train, referring to FIG. 1.

The equidirectional transfer case has an input end of the equidirectional transfer case, an inner output end of the equidirectional transfer case, and an outer output end of the equidirectional transfer case, and the equidirectional transfer case converts a rotation speed of the input end thereof into two rotation speeds of the inner output end and outer output end thereof in the same rotation direction. For the planetary gear train of the equidirectional transfer case, the component corresponding to the term having the maximum absolute value of a coefficient in a motion characteristic equation is used as the input end of the equidirectional transfer case, and the other two components are respectively used as the inner output end of the equidirectional transfer case and the outer output end of the equidirectional transfer case. The equidirectional transfer case of the present embodiment adopts the bevel gear single-layer planetary gear train. The component corresponding to the term having the maximum absolute value of the coefficient in the motion characteristic equation is a planetary carrier, and the planetary carrier is used as the input end (1) of the equidirectional transfer case. A left central gear is used as the inner output end (2) of the equidirectional transfer case, and a right central gear is used as the outer output end (3) of the equidirectional transfer case. The number of gear groups of the bevel gear planetary gears in the planetary gear train is two.

The commutator includes two paths of transmission structures, the first-path transmission structure has a first input end and a first output end, and the second-path transmission structure has a second input end and a second output end. The commutator converts two rotation speeds of the first input end and second input end thereof in the same rotation direction into two rotation speeds of the first output end and second output end thereof in opposite rotation directions, and also converts two rotation speeds of the first output end and second output end thereof in the same rotation direction into two rotation speeds of the first input end and second input end thereof in opposite rotation directions. The present embodiment adopts a bevel gear planetary gear train commutator (4), an inner shaft of a quill shaft is provided with an inner input end and an inner output end, a left central gear and a right central gear of a bevel gear single-layer planetary gear train on an outer shaft of the quill shaft are used as an outer input end of the commutator and an outer output end of the commutator respectively. The bevel gear planetary gears are meshed with the left central gear and the right central gear to fix a planetary carrier. The number of gear groups of the bevel gear planetary gears of the planetary gear train is two. The rotation direction of the outer input end of the commutator is opposite to that of the outer output end of the commutator. The number of teeth of the left central gear=the number of teeth of the right central gear=the number of teeth of the bevel gear planetary gear=18.

The actuator is a transmission device synthesizing and converting two rotation speeds of an inner input end and an outer input end thereof in opposite rotation directions into a rotation speed of planetary gears, and converts two rotation speeds of the inner input end and outer input end thereof in the same rotation direction into a rotation speed of a planetary carrier. A single-layer planetary gear train is adopted, a planetary gear train shaft is an actuator shaft, a left central gear is used as the outer input end of the actuator, a right central gear is used as the inner input end of the actuator, the planetary carrier is used as a revolving control end, one to six planetary gears are used as an output end, an output shaft is gear shafts of these planetary gears, the output shaft and the actuator shaft form a turning angle, and the output end is also the output end of the equidirectional transfer universal transmission. The actuator of the present embodiment adopts the bevel gear single-layer planetary gear train, the left central gear is used as the outer input end (5) of the actuator, the right central gear is used as the inner input end (6) of the actuator, the planetary carrier is used as the revolving control end (7), one bevel gear planetary gear is used as the output end (8), the output shaft is a gear shaft of this bevel gear planetary gear, and the output shaft and the actuator shaft form a fixed turning angle. The number of gear groups of the bevel gear planetary gears in the planetary gear train is two.

Figure 2:
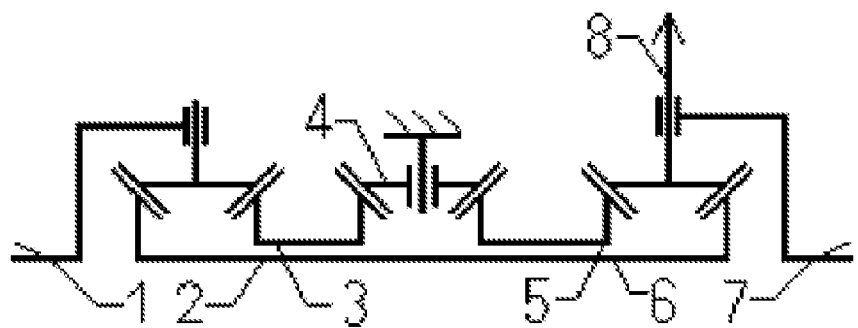
FIG. 2 is a schematic diagram of a first special example of the equidirectional transfer universal transmission according to the present invention, is a schematic diagram of a special example of Embodiment 1, and is a half schematic diagram. 1 denotes the input end of the equidirectional transfer case, 2 denotes the inner output end of the equidirectional transfer case, 3 denotes the outer output end of the equidirectional transfer case, 4 denotes the commutator, 5 denotes the outer input end of the actuator, 6 denotes the inner input end of the actuator, 7 denotes the revolving control end, and 8 denotes the output end of the actuator. In the drawing, the equidirectional transfer case adopts a bevel gear single-layer planetary gear train, the commutator is a bevel gear planetary gear train commutator, and the actuator adopts a bevel gear single-layer planetary gear train; and characteristic parameters of the three bevel gear single-layer planetary gear trains in the drawing are all 1.0.

A method for setting respective components in the equidirectional transfer case and the actuator of the present embodiment is that a characteristic parameter is set to 0.8 to 1.25 when the equidirectional transfer case adopts the single-layer planetary gear train, and the characteristic parameter of the bevel gear single-layer planetary gear train of the actuator is set to 0.8 to 1.25. In this way, the revolving control moments of the forward and reverse rotations of the output shaft around the actuator shaft are balanced approximately, and the input power rotation speed is nearly all converted into the rotation speed of the output end of the actuator, and approaches and does not interfere with the revolving control rotation speed at which the output shaft is pushed to revolve around the actuator shaft. The optimal setting example refers to FIG. 2, the method for setting respective components is: the characteristic parameter of the single-layer planetary gear train of the equidirectional transfer case is equal to 1.0, and the characteristic parameter of the bevel gear single-layer planetary gear train of the actuator is equal to 1.0. In this way, the revolving control moments of the forward and reverse rotations of the output shaft around the actuator shaft are balanced, the input power rotation speed is all converted into the power rotation speed of the output end of the actuator, and does not interfere with the revolving control rotation speed which is input by the revolving control end and at which the output shaft is pushed to revolve around the actuator shaft, and the output shaft has no unidirectional bearing moment. It is not necessary to use a revolving control device with a complex structure to overcome the unidirectional bearing moment, and the revolving control device has a simple structure. The specific numbers of teeth of respective components of the special example are set as: for the bevel gear single-layer planetary gear train of the equidirectional transfer case, the number of teeth of the left central gear=the number of the left central gears=the number of teeth of the bevel gear planetary gear=18; and for the bevel gear single-layer planetary gear train of the actuator, the number of teeth of the left central gear=the number of teeth of the right central gear=the number of teeth of the bevel gear planetary gear=18, and the output shaft and the actuator shaft form a turning angle of 90 degrees.

A connection method of the present embodiment is: the inner output end (2) of the equidirectional transfer case is directly connected to the inner input end of the commutator, and the outer output end (3) of the equidirectional transfer case is directly connected to the outer input end of the commutator. The inner output end of the commutator is directly connected to the inner input end (6) of the actuator, and the outer output end of the commutator is directly connected to the outer input end (5) of the actuator. The input end (1) of the equidirectional transfer case is connected to a power source, the revolving control end (7) is connected to the revolving control device, and the output end (8) of the actuator is connected to a power use device.

Embodiment 2: a second example of the equidirectional transfer universal transmission according to the present invention is formed by connecting an equidirectional transfer case, a commutator and an actuator. The equidirectional transfer case adopts a double-sun gear planetary gear train, a position-preserving two-way commutator is adopted, and the actuator adopts a bevel gear single-layer planetary gear train, referring to FIG. 3.

The equidirectional transfer case has an input end of the equidirectional transfer case, an inner output end of the equidirectional transfer case, and an outer output end of the equidirectional transfer case, and the equidirectional transfer case converts a rotation speed of the input end thereof into two rotation speeds of the inner output end and outer output end thereof in the same rotation direction. For the planetary gear train of the equidirectional transfer case, the component corresponding to the term having the maximum absolute value of a coefficient in a motion characteristic equation is used as the input end of the equidirectional transfer case, and the other two components are respectively used as the inner output end of the equidirectional transfer case and the outer output end of the equidirectional transfer case. The equidirectional transfer case of Embodiment 2 adopts the double-sun gear planetary gear train. The component corresponding to the term having the maximum absolute value of the coefficient in the motion characteristic equation is one central gear with a larger pitch circle diameter in two central gears, the central gear with the larger pitch circle diameter is used as the input end (1) of the equidirectional transfer case, a planetary carrier is used as the inner output end (2) of the equidirectional transfer case, and the other central gear is used as the outer output end (3) of the equidirectional transfer case. The number of gear groups of the planetary gears in the planetary gear train is two, and a module of the left central gear is not equal to a module of the right central gear.

The commutator includes two paths of transmission structures, the first-path transmission structure has a first input end and a first output end, and the second-path transmission structure has a second input end and a second output end. The commutator converts two rotation speeds of the first input end and second input end thereof in the same rotation direction into two rotation speeds of the first output end and second output end thereof in opposite rotation directions, and also converts two rotation speeds of the first output end and second output end thereof in the same rotation direction into two rotation speeds of the first input end and second input end thereof in opposite rotation directions. The present embodiment adopts the position-preserving two-way commutator (4). An inner input end and an outer input end of the position-preserving two-way commutator form an input quill shaft, and an inner output end and an outer output end form an output quill shaft. The input quill shaft and the output quill shaft form an angle of 90 degrees. An inner driving bevel gear is disposed on the inner input end, an outer driving bevel gear is disposed on the outer input end, an inner driven bevel gear is disposed on the inner output end, an outer driven bevel gear is disposed on the outer output end, the inner driving bevel gear is meshed with the inner driven bevel gear, and the outer driving bevel gear is meshed with the outer driven bevel gear. In this way, if two rotation speeds in the same rotation direction are input on the inner input end and the outer input end, two rotation speeds in opposite rotation directions will be output on the inner output end and the outer output end. The number of teeth of the driving inner bevel gear, the number of teeth of the driven inner bevel gear, the number of teeth of the driving outer bevel gear, and the number of teeth of the driven outer bevel gear of the position-preserving two-way commutator are all set to 18. A transmission ratio from the inner input end to the inner output end is 1.0. A transmission ratio from the outer input end to the outer output end is −1.0, and a gear module of the inner driving bevel gear is not equal to a gear module of the outer driving bevel gear.

The actuator is a transmission device synthesizing and converting two rotation speeds of an inner input end and an outer input end thereof in opposite rotation directions into a rotation speed of planetary gears, and converts two rotation speeds of the inner input end and outer input end thereof in the same rotation direction into a rotation speed of a planetary carrier. A single-layer planetary gear train is adopted, a planetary gear train shaft thereof is an actuator shaft, a left central gear is used as the outer input end of the actuator, a right central gear is used as the inner input end of the actuator, the planetary carrier is used as a revolving control end, one to six planetary gears are used as an output end, an output shaft is gear shafts of these planetary gears, the output shaft and the actuator shaft form a turning angle, and the output end is also the output end of the equidirectional transfer universal transmission. In Embodiment 2, the actuator adopts the bevel gear single-layer planetary gear train, the left central gear is used as the outer input end (5) of the actuator, the right central gear is used as the inner input end (6) of the actuator, the planetary carrier is used as the revolving control end (7), one bevel gear planetary gear is used as the output end (8), the output shaft is a gear shaft of this bevel gear planetary gear, and the output shaft and the actuator shaft form a turning angle of 90 degrees. The number of gear groups of the bevel gear planetary gears in the planetary gear train is two.

In Embodiment 2, a method for setting respective components in the equidirectional transfer case and the actuator is as follows: the characteristic parameter of the double-sun gear planetary gear train of the equidirectional transfer case is equal to 2.0, and the characteristic parameter of the bevel gear single-layer planetary gear train of the actuator is equal to 1.0. The specific numbers of teeth of respective components are set as follows: for the double-sun gear planetary gear train of the equidirectional transfer case, the number of teeth of the left sun gear is 36, the number of teeth of the left planetary gear is 18, the number of teeth of the right planetary gear is 18, the number of teeth of the right sun gear is 18, and a gear module of the left sun gear is not equal to a gear module of the right sun gear; and for the bevel gear single-layer planetary gear train of the actuator, the number of teeth of the left central gear=the number of teeth of the right central gear=the number of teeth of the bevel gear planetary gear=18.

In Embodiment 2, a connection method is: the inner output end (2) of the equidirectional transfer case is directly connected to the inner input end of the commutator, and the outer output end (3) of the equidirectional transfer case is directly connected to the outer input end of the commutator. The inner output end of the commutator is directly connected to the inner input end (6) of the actuator, and the outer output end of the commutator is directly connected to the outer input end (5) of the actuator. The input end (1) of the equidirectional transfer case is connected to a power source, the revolving control end (7) is connected to the revolving control device, and the output end (8) of the actuator is connected to a power use device.

In Embodiment 2, a power rotation speed input from the power source is converted into the power rotation speed of the output end of the actuator. The input and output of the power rotation speed and the revolving speed input from the revolving control device do not interfere with one another. In Embodiment 2, by inputting the revolving speed, the output shaft is controlled to revolve around the actuator shaft, and the forward and reverse revolving moments of the output shaft are controlled to be balanced. The output shaft has no unidirectional bearing moment. The revolving control device does not need to overcome the unidirectional bearing moment. The revolving control device has a simple structure.

Figure 4:
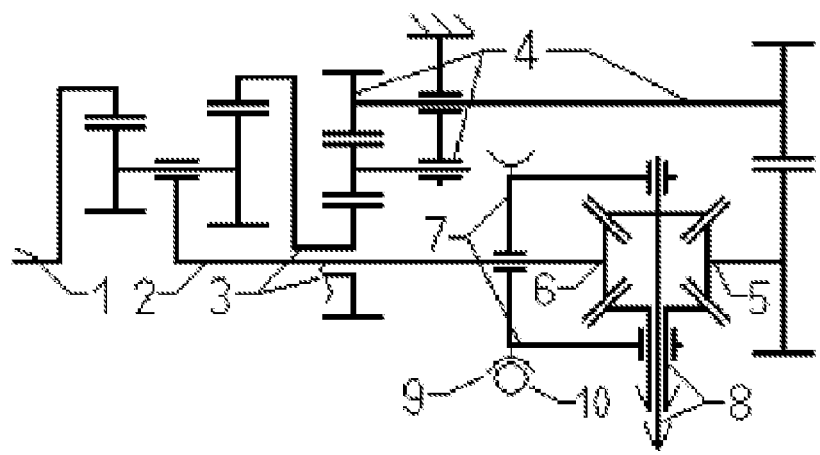
FIG. 4 is a schematic diagram of a third example of the equidirectional transfer universal transmission according to the present invention, and is also a schematic diagram of Embodiment 3. 1 denotes the input end of the equidirectional transfer case, 2 denotes the inner output end of the equidirectional transfer case, 3 denotes the outer output end of the equidirectional transfer case, 4 denotes the commutator, 5 denotes the outer input end of the actuator, 6 denotes the inner input end of the actuator, 7 denotes the revolving control end, and 8 denotes coaxial reversing double-output ends. In the drawing, the equidirectional transfer case adopts a double-inner gear ring planetary gear train, the commutator is a double-sun gear double-planetary gear shaft planetary gear train commutator, and the actuator adopts a bevel gear single-layer planetary gear train; and in the drawing, the equidirectional transfer case is shown in a half schematic diagram, and the commutator and actuator are shown in an entire schematic diagram.
Figure 5:
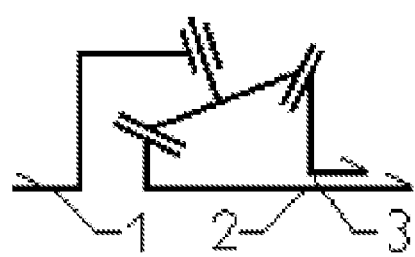
FIG. 5 is a schematic diagram of the equidirectional transfer case adopting a bevel gear single-layer planetary gear train, and is a half schematic diagram. 1 denotes the input end, 2 denotes the inner output end, and 3 denotes the outer output end.
Figure 6:
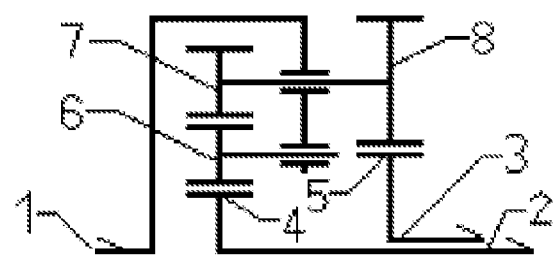
FIG. 6 is a schematic diagram of the equidirectional transfer case adopting a double-sun gear double-planetary gear shaft planetary gear train, and is a half schematic diagram. 1 denotes the input end, 2 denotes the inner output end, 3 denotes the outer output end, 4 denotes a left central gear, 5 denotes a right central gear, 6 denotes an inner planetary gear, 7 denotes a left outer planetary gear, and 8 denotes a right outer planetary gear.
Figure 7:
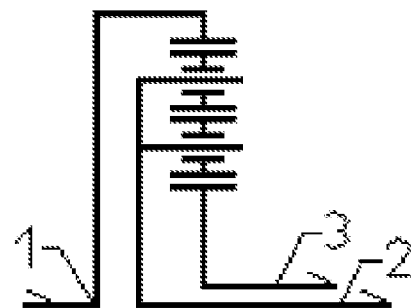
FIG. 7 is a schematic diagram of the equidirectional transfer case adopting a cylindrical gear double-layer planetary gear train, and is a half schematic diagram. 1 denotes the input end, 2 denotes the inner output end, and 3 denotes the outer output end.
Figure 8:
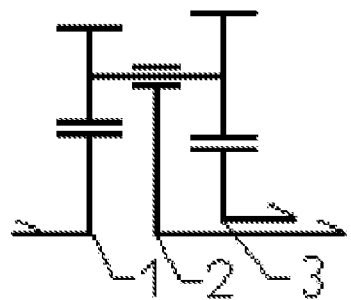
FIG. 8 is a schematic diagram of the equidirectional transfer case adopting a double-sun gear planetary gear train, and is a half schematic diagram. 1 denotes the input end, 2 denotes the inner output end, and 3 denotes the outer output end.
Figure 9:
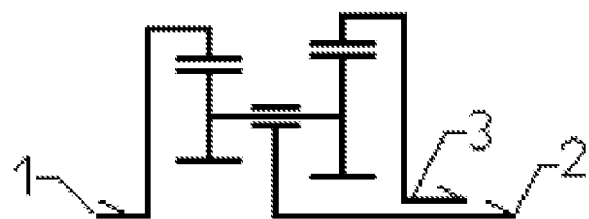
FIG. 9 is a schematic diagram of the equidirectional transfer case adopting a double-inner gear ring planetary gear train, and is a half schematic diagram. 1 denotes the input end, 2 denotes the inner output end, and 3 denotes the outer output end.
Figure 10:
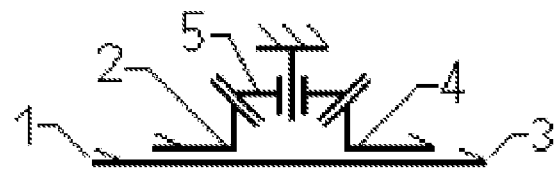
FIG. 10 is a schematic diagram of a bevel gear planetary gear train commutator, and is a half schematic diagram. 1 denotes an inner input end, 2 denotes an outer input end, 3 denotes an inner output end, 4 denotes an outer output end, and 5 denotes a bevel gear planetary gear.
Figure 11:
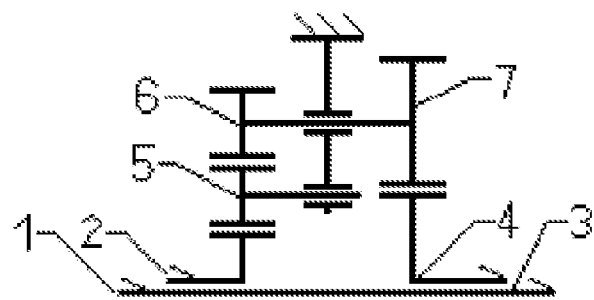
FIG. 11 is a schematic diagram of a double-sun gear and double-planetary gear shaft planetary gear train commutator, and is a half schematic diagram. 1 denotes the inner input end, 2 denotes the outer input end, 3 denotes the inner output end, 4 denotes the outer output end, 5 denotes the inner planetary gear, 6 denotes the left outer planetary gear, and 7 denotes the right outer planetary gear.
Figure 12:
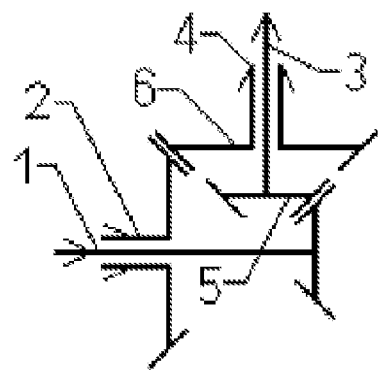
FIG. 12 is a schematic diagram of a position-preserving two-way commutator, and is a whole schematic diagram. 1 denotes the inner input end, 2 denotes the outer input end, 3 denotes the inner output end, 4 denotes the outer output end, 5 denotes an inner driven bevel gear, and 6 denotes an outer driven bevel gear.
Figure 13:
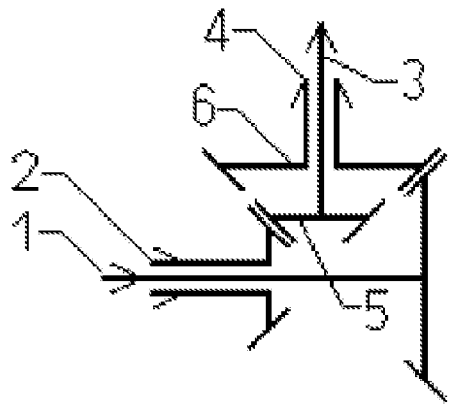
FIG. 13 is a schematic diagram of a position-changing two-way commutator, and is a whole schematic diagram. 1 denotes the inner input end, 2 denotes the outer input end, 3 denotes the inner output end, 4 denotes the outer output end, 5 denotes the inner driven bevel gear, and 6 denotes the outer driven bevel gear.
Figure 14:
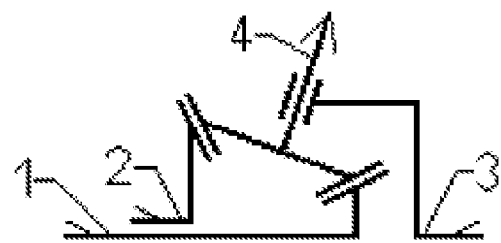
FIG. 14 is a schematic diagram of an actuator adopting a bevel gear single-layer planetary gear train, and is a half schematic diagram. 1 denotes an inner input end of the actuator, 2 denotes an outer input end of the actuator, 3 denotes the revolving control end, and 4 denotes an output end.
Figure 15:
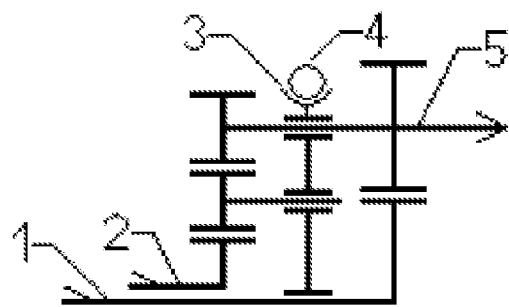
FIG. 15 is a schematic diagram of an actuator adopting a double-sun gear and double-planetary gear shaft planetary gear train. 1 denotes the inner input end of the actuator, 2 denotes the outer input end of the actuator, 3 denotes a worm gear disposed on the revolving control end, 4 denotes a worm, and 5 denotes the output end. In the drawing, the worm is shown in a whole schematic diagram, and the rest is shown in a half schematic diagram.

Embodiment 3: a third example of the equidirectional transfer universal transmission according to the present invention is formed by connecting an equidirectional transfer case, a commutator and an actuator, the equidirectional transfer case adopts a double-inner gear ring planetary gear train, a double-sun gear and double-planetary gear shaft planetary gear train commutator is adopted, and the actuator adopts a bevel gear single-layer planetary gear train, referring to FIG. 4.

The equidirectional transfer case has an input end of the equidirectional transfer case, an inner output end of the equidirectional transfer case, and an outer output end of the equidirectional transfer case, and the equidirectional transfer case converts a rotation speed of the input end thereof into two rotation speeds of the inner output end and outer output end thereof in the same rotation direction. For the planetary gear train of the equidirectional transfer case, the component corresponding to the term having the maximum absolute value of a coefficient in a motion characteristic equation is used as the input end of the equidirectional transfer case, and the other two components are respectively used as the inner output end of the equidirectional transfer case and the outer output end of the equidirectional transfer case. In Embodiment 3, the equidirectional transfer case adopts a double-inner gear ring planetary gear train. The component corresponding to the term having the maximum absolute value of the coefficient in the motion characteristic equation is one central gear with a smaller pitch circle diameter in two central gears, the central gear (inner gear ring) with the smaller pitch circle diameter is used as the input end (1) of the equidirectional transfer case, a planetary carrier is used as the inner output end (2) of the equidirectional transfer case, and the other central gear (inner gear ring) is used as the outer output end (3) of the equidirectional transfer case. The number of gear groups of the planetary gears in the planetary gear train is two. A gear module of the left central gear is not equal to a gear module of the right central gear.

Figure 3:
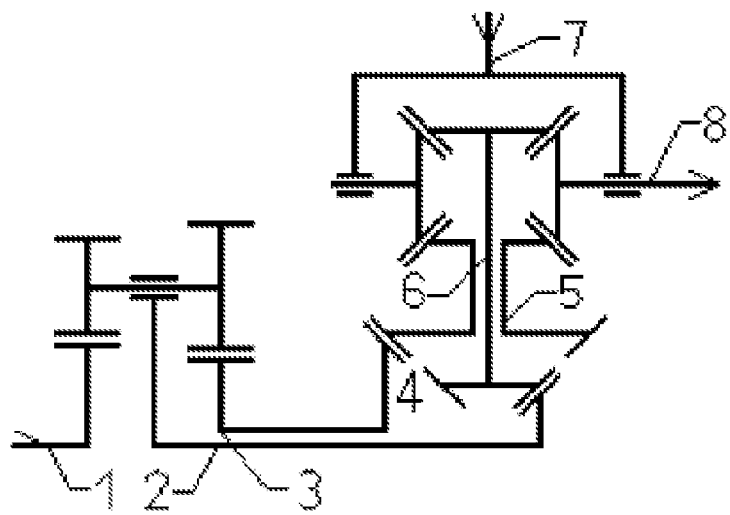
FIG. 3 is a schematic diagram of a second example of the equidirectional transfer universal transmission according to the present invention, and is also a schematic diagram of Embodiment 2. 1 denotes the input end of the equidirectional transfer case, 2 denotes the inner output end of the equidirectional transfer case, 3 denotes the outer output end of the equidirectional transfer case, 4 denotes the commutator, 5 denotes the outer input end of the actuator, 6 denotes the inner input end of the actuator, 7 denotes the revolving control end, and 8 denotes the output end of the actuator. In the drawing, the equidirectional transfer case adopts a double-sun gear planetary gear train, the commutator is a position-preserving two-way commutator, and the actuator adopts a bevel gear single-layer planetary gear train; and in the drawing, the equidirectional transfer case is shown in a half schematic diagram, and the drawing behind an inner driven bevel gear and an outer driven bevel gear of the commutator is an entire schematic diagram.

The commutator includes two paths of transmission structures, the first-path transmission structure has a first input end and a first output end, and the second-path transmission structure has a second input end and a second output end. The commutator converts two rotation speeds of the first input end and second input end thereof in the same rotation direction into two rotation speeds of the first output end and second output end thereof in opposite rotation directions, and also converts two rotation speeds of the first output end and second output end thereof in the same rotation direction into two rotation speeds of the first input end and second input end thereof in opposite rotation directions. Embodiment 3 adopts the double-sun gear and double-planetary gear shaft planetary gear train commutator (4), an outer shaft adopts a double-sun gear and double-planetary gear shaft planetary gear train, and an inner shaft of a quill shaft is provided with an inner input end and an inner output end, which are directly connected. A left central gear and a right central gear of the double-sun gear and double-planetary gear shaft planetary gear train on the outer shaft of the quill shaft are used as the outer input end of the commutator and the outer output end of the commutator respectively to fix a planetary carrier. The number of gear groups of inner planetary gears, left outer planetary gears, and right outer planetary gears of the planetary gear train is one. A rotation direction of the outer input end of the commutator is opposite to a rotation direction of the outer output end of the commutator. As shown in FIG. 3, the outer input end of the commutator is located on the left side of the actuator, and the outer output end of the commutator is located on the right side of the actuator. The number of teeth of the left central gear, the number of teeth of the inner planetary gear, the number of teeth of the left outer planetary gear, the number of teeth of the right central gear, and the number of teeth of the right outer planetary gear of the commutator are all set to 18. A transmission ratio from the inner input end to the inner output end is 1.0, and a transmission ratio from the outer input end to the outer output end is −1.0. A gear module of the left central gear is not equal to a gear module of the right central gear.

The actuator is a transmission device synthesizing and converting two rotation speeds of an inner input end and an outer input end thereof in opposite rotation directions into a rotation speed of planetary gears and converts two rotation speeds of the inner input end and outer input end thereof in the same rotation direction into a rotation speed of a planetary carrier. A single-layer planetary gear train is adopted, a planetary gear train shaft thereof is an actuator shaft, the planetary carrier is used as a revolving control end, one to six planetary gears are used as the output end, an output shaft is gear shafts of these planetary gears, the output shaft and the actuator shaft form a turning angle, and the output end is also the output end of the equidirectional transfer universal transmission. This actuator is different from an ordinary actuator in that in Embodiment 3, a right central gear is used as the outer input end of the actuator, and a left central gear is used as the inner input end of the actuator. In Embodiment 3, the actuator adopts the bevel gear single-layer planetary gear train, the left central gear is used as the inner input end (6) of the actuator, the right central gear is used as the outer input end (5) of the actuator, the planetary carrier is used as the revolving control end (7), a worm gear (9) is disposed on the revolving control end (7) of the planetary carrier, and a worm (10) meshed with the worm gear (9) is disposed. The revolving speed is input to the revolving control end (7) through the worm gear-worm device, the two bevel gear planetary gears are used as coaxial reversing double output ends (8), the output shaft is a coaxial reversing quill shaft output shaft formed by the two bevel gear planetary gear shafts, and the output shaft and the actuator shaft form a turning angle of 90 degrees. The number of gear groups of the bevel gear planetary gears in the planetary gear train is two.

In Embodiment 3, a method for setting respective components in the equidirectional transfer case and the actuator is as follows: the characteristic parameter of the double-inner gear ring planetary gear train of the equidirectional transfer case is equal to 2.0, and the characteristic parameter of the bevel gear single-layer planetary gear train of the actuator is equal to 1.0. The specific numbers of teeth of respective components are set as follows: for the double-inner gear ring planetary gear train of the equidirectional transfer case, the number of teeth of the left inner gear ring is 84, the number of teeth of the left planetary gear is 18, the number of teeth of the right planetary gear is 18, and the number of teeth of the right inner gear ring is 42; and for the bevel gear single-layer planetary gear train of the actuator, the number of teeth of the left bevel gear central gear=the number of teeth of the right bevel gear central gear=the number of teeth of the bevel gear planetary gear=18.

A connection method of Embodiment 3 is: the inner output end (2) of the equidirectional transfer case is directly connected to the inner input end of the commutator, the outer output end (3) of the equidirectional transfer case is directly connected to the outer input end of the commutator, the inner output end of the commutator is directly connected to the inner input end (6) of the actuator from the left side of the actuator, and the outer output end of the commutator is directly connected to the outer input end (5) of the actuator from the right side of the actuator. The input end (1) of the equidirectional transfer case is connected to a power source, the revolving control end (7) is indirectly connected to the revolving control device through the worm gear-worm device, and the coaxial reversing double output ends (8) are connected to coaxial reversing double rotor wings of a power use device.

In Embodiment 3, a power rotation speed input from the power source is converted into the power rotation speed of the coaxial reversing double output ends (8). The input and output of the power rotation speed and the revolving speed do not interfere with one another. In Embodiment 3, by inputting the revolving speed, the output shaft is controlled to revolve around the actuator shaft, and the forward and reverse revolving moments of the output shaft are controlled to be balanced. The output shaft has no unidirectional bearing moment. The revolving control device does not need to overcome the unidirectional bearing moment. The revolving control device has a simple structure. Due to the blocking of the double-sun gear and double-planetary gear shaft planetary gear train commutator, the coaxial reversing quill shaft output shaft of Embodiment 3 revolves around the actuator shaft at an angle less than 360 degrees, but the coaxial reversing double output ends of Embodiment 3 have a simple and compact structure and a great practical value.

Figure 16:
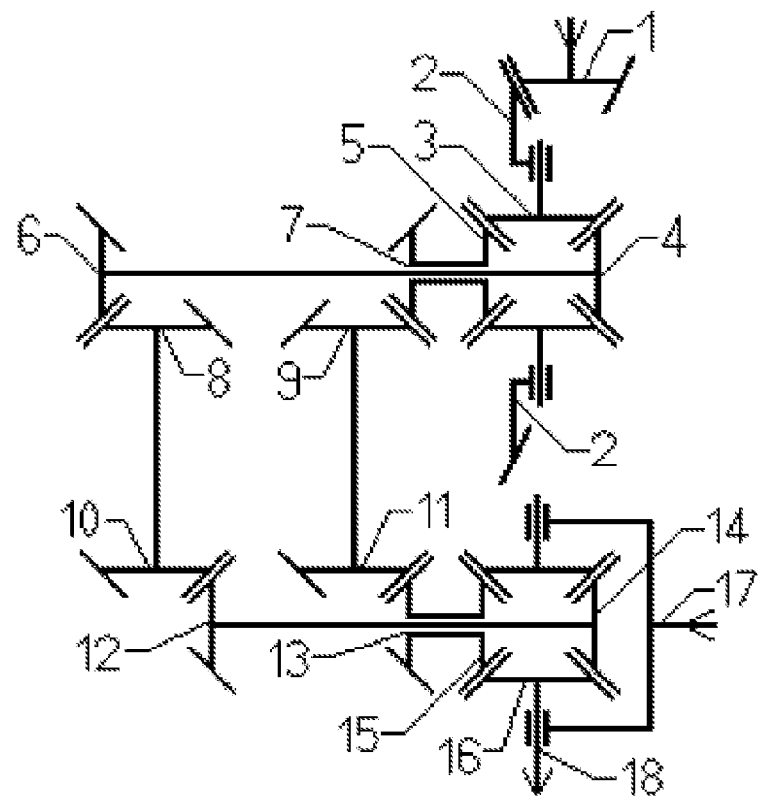
FIG. 16 is a schematic diagram of a fourth example of the equidirectional transfer universal transmission according to the present invention, is also a schematic diagram of Embodiment 4, and is a whole schematic diagram. 1 denotes a driving bevel gear, 2 denotes a driven bevel gear, 3 denotes the bevel gear planetary gear, 4 denotes the inner output end of the equidirectional transfer case, 5 denotes the outer output end of the equidirectional transfer case, 6 denotes a left input bevel gear, 7 denotes a right input bevel gear, 8 denotes a left steering bevel gear, 9 denotes a right steering bevel gear, 10 denotes a left transmission bevel gear, 11 denotes a right transmission bevel gear, 12 denotes a left output bevel gear, 13 denotes a right output bevel gear, 14 denotes the inner input end of the actuator, 15 denotes the outer input end of the actuator, 16 denotes the bevel gear planetary gear of the actuator, 17 denotes the revolving control end, and 18 denotes the output end of the actuator. In the drawing, the equidirectional transfer case adopts a bevel gear single-layer planetary gear train, the commutator is a non-quill shaft commutator, and the actuator adopts a bevel gear single-layer planetary gear train; and the characteristic parameters of the two bevel gear single-layer planetary gear trains in the drawing are both 1.0.

Embodiment 4: a fourth example of the equidirectional transfer universal transmission according to the present invention is formed by connecting an equidirectional transfer case, a commutator and an actuator, the equidirectional transfer case adopts a bevel gear single-layer planetary gear train, a non-quill shaft commutator is adopted, and the actuator adopts a bevel gear single-layer planetary gear train, referring to FIG. 16.

In Embodiment 4, the equidirectional transfer case adopts the bevel gear single-layer planetary gear train, the component corresponding to the term having the maximum absolute value of a coefficient in the motion characteristic equation is a planetary carrier, the planetary carrier is used as the input end of the equidirectional transfer case, a driven bevel gear (2) is disposed on the planetary carrier, a driving bevel gear (1) meshed with the driven bevel gear (2) is disposed, and the power rotation speed is input to the planetary carrier through the indirect connection of the driving bevel gear (1) and the driven bevel gear (2). A right central gear is used as the inner output end (4) of the equidirectional transfer case, and a left central gear is used as the outer output end (5) of the equidirectional transfer case. The number of gear groups of the bevel gear planetary gears in the planetary gear train is two.

Embodiment 4 adopts the non-quill shaft commutator. The non-quill shaft commutator includes a left transmission and a right transmission, the left transmission has a left input end and a left output end, and the right transmission has a right input end and a right output end. The non-quill shaft commutator converts two rotation speeds of the left input end and right input end thereof in the same rotation direction into two rotation speeds of the left output end and right output end thereof in opposite rotation directions, and also converts two rotation speeds of the left output end and right output end thereof in the same rotation direction into two rotation speeds of the left input end and right input end thereof in opposite rotation directions. For the non-quill shaft commutator of Embodiment 4, the left transmission and the right transmission each adopt two groups of bevel gear pairs for transmission; the left transmission includes a left input bevel gear (6), a left steering bevel gear (8), a left transmission bevel gear (10), and a left output bevel gear (12); and the right transmission includes a right input bevel gear (7), a right steering bevel gear (9), a right transmission bevel gear (11), and a right output bevel gear (13). The left input bevel gear (6) is used as the left input end, the right input bevel gear (7) is used as the right input end, the left output bevel gear (12) is used as the left output end, and the right output bevel gear (13) is used as the right output end. The left input bevel gear (6) is meshed with the left steering bevel gear (8), the left steering bevel gear (8) is directly connected to the left transmission bevel gear (10), and the left transmission bevel gear (10) is meshed with the left output bevel gear (12). The right input bevel gear (7) is meshed with the right steering bevel gear (9), the right steering bevel gear (9) is directly connected to the right transmission bevel gear (11), and the right transmission bevel gear (11) is meshed with the right output bevel gear (13). A transmission ratio of the left transmission is set to 1.0 and a transmission ratio of the right transmission is set to −1.0, namely, the number of teeth of each of these eight bevel gears (6), (8), (10), (12), (7), (9), (11) and (13) is set to 18.

In Embodiment 4, the actuator adopts the bevel gear single-layer planetary gear train, a left central gear is used as the outer input end (15) of the actuator, a right central gear is used as the inner input end (14) of the actuator, a planetary carrier is used as a revolving control end (17), one bevel gear planetary gear (16) is used as an output end (18), an output shaft is the gear shaft of the bevel gear planetary gear, and the output shaft and the actuator shaft form a turning angle of 90 degrees. The number of gear groups of the bevel gear planetary gears in the planetary gear train is two.

In Embodiment 4, a method for setting respective components in the equidirectional transfer case and the actuator is: the characteristic parameter of the single-layer planetary gear train of the equidirectional transfer case is equal to 1.0, and the characteristic parameter of the bevel gear single-layer planetary gear train of the actuator is equal to 1.0. The specific numbers of teeth of respective components are set as: for the bevel gear single-layer planetary gear train of the equidirectional transfer case, the number of teeth of the left central gear=the number of the left central gears=the number of teeth of the bevel gear planetary gear=18; and for the bevel gear single-layer planetary gear train of the actuator, the number of teeth of the left central gear=the number of teeth of the right central gear=the number of teeth of the bevel gear planetary gear=18.

A connection method of Embodiment 4 is as follows: the inner output end (4) of the equidirectional transfer case is directly connected to the left input end of the commutator, and the outer output end (5) of the equidirectional transfer case is directly connected to the right input end of the commutator. The left output end of the commutator is directly connected to the inner input end (14) of the actuator, and the right output end of the commutator is directly connected to the outer input end (15) of the actuator. The input end of the equidirectional transfer case is indirectly connected to a power source through the driven bevel gear (2) and the driving bevel gear (1), the revolving control end (17) is connected to the revolving control device, and the output end (18) of the actuator is connected to a power use device.

In Embodiment 4, a power rotation speed input from the power source is converted into the power rotation speed of the output end of the actuator. The input and output of the power rotation speed and the revolving speed input from the revolving control device do not interfere with one another. In the preset embodiment, by inputting the revolving speed, the output shaft is controlled to revolve around the actuator shaft, and the forward and reverse revolving moments of the output shaft are controlled to be balanced. The output shaft has no unidirectional bearing moment. The revolving control device does not need to overcome the unidirectional bearing moment. The revolving control device has a simple structure.

The basic principles, main features and advantages of the present invention have been shown and described above. Those skilled in the art should understand that the present invention is not limited by the above embodiments, and there are various changes and improvements to the present invention without departing from the spirit and scope of the present invention, and these changes and improvements all fall within the scope to be protected of the present invention. The scope of protection of the present invention is defined by the appended claims and equivalents.

What is claimed is:

1. An equidirectional transfer universal transmission, formed by connecting an equidirectional transfer case, a commutator and an actuator, wherein the equidirectional transfer case has an input end of the equidirectional transfer case, an inner output end of the equidirectional transfer case, and an outer output end of the equidirectional transfer case, the equidirectional transfer case converts a rotation speed of the input end thereof into two rotation speeds of the inner output end and outer output end thereof in the same rotation direction, the equidirectional transfer case adopts a planetary gear train, the component corresponding to a term having a maximum absolute value of a coefficient in a motion characteristic equation is used as the input end of the equidirectional transfer case, and the other two components are respectively used as the inner output end of the equidirectional transfer case and the outer output end of the equidirectional transfer case, and the planetary gear train of the equidirectional transfer case adopts one of five types of planetary gear trains; the commutator comprises two paths of transmission structures, the first-path transmission structure has a first input end and a first output end, the second-path transmission structure has a second input end and a second output end, the commutator converts two rotation speeds of the first input end and second input end thereof in the same rotation direction into two rotation speeds of the first output end and second output end thereof in opposite rotation directions, and also converts two rotation speeds of the first output end and second output end thereof in the same rotation direction into two rotation speeds of the first input end and second input end thereof in opposite rotation directions, the commutator comprises a quill shaft commutator and a non-quill shaft commutator, wherein the quill shaft commutator comprises an inner shaft and an outer shaft of a quill shaft, the inner shaft has an inner input end and an inner output end, the outer shaft has an outer input end and an outer output end, the quill shaft commutator converts two rotation speeds of the inner input end and outer input end thereof in the same rotation direction into two rotation speeds of the inner output end and outer output end thereof in opposite rotation directions, and also converts two rotation speeds of the inner output end and outer output end thereof in the same rotation direction into two rotation speeds of the inner input end and outer input end thereof in opposite rotation directions, and there are four types of quill shaft commutators; in the present invention, for a bevel gear planetary gear train commutator and a double-sun gear and double-planetary gear shaft planetary gear train commutator, an inner shaft transmission ratio is set to 1.0, and an outer shaft transmission ratio is set to −1.0; for a position-preserving two-way commutator, a transmission ratio from the inner input end to the inner output end is set to −1.0, and a transmission ratio from the outer input end to the outer output end is set to 1.0; for a position-changing two-way commutator, a transmission ratio from the inner input end to the outer output end is set to −1.0, and a transmission ratio from the outer input end to the inner output end is set to 1.0; the non-quill shaft commutator comprises a left transmission and a right transmission, the left transmission has a left input end and a left output end, the right transmission has a right input end and a right output end, and the non-quill shaft commutator converts two rotation speeds of the left input end and right input end thereof in the same rotation direction into two rotation speeds of the left output end and right output end thereof in opposite rotation directions, and also converts two rotation speeds of the left output end and right output end thereof in the same rotation direction into two rotation speeds of the left input end and right input end thereof in opposite rotation directions; for the non-quill shaft commutator, a transmission ratio of the left transmission is set to be equal to the negative value of a transmission ratio of the right transmission; the actuator is a transmission device synthesizing and converting two rotation speeds of an inner input end and outer input end thereof in opposite rotation directions into a rotation speed of a planetary gear of the actuator, converts two rotation speeds of the inner input end and outer input end thereof in the same rotation direction into a rotation speed of a planetary carrier thereof, and adopts a single-layer planetary gear train, of which a planetary gear train shaft is an actuator shaft, a left central gear is used as the outer input end of the actuator, and a right central gear is used as the inner input end of the actuator, the planetary carrier is used as a revolving control end, one to six planetary gears are used as an output end, an output shaft is gear shafts of these planetary gears, the output shaft and the actuator shaft form a turning angle, the output end of the actuator is also an output end of the equidirectional transfer universal transmission, and the actuator adopts one of two single-layer planetary gear trains; a connection method according to the present invention is that the inner output end of the equidirectional transfer case is directly connected to the inner input end of the commutator, the outer output end of the equidirectional transfer case is directly connected to the outer input end of the commutator, the inner output end of the commutator is directly connected to the inner input end of the actuator, the outer output end of the commutator is directly connected to the outer input end of the actuator, the input end of the equidirectional transfer case is connected to a power source to input a power rotation speed, the output end of the actuator is connected to a power use device, and the revolving control end is connected to a revolving control device; when the commutator is the non-quill shaft commutator, the left input end of the commutator is equivalent to the inner input end of the commutator, the right input end of the commutator is equivalent to the outer input end of the commutator, the left output end of the commutator is equivalent to the inner output end of the commutator and the right output end of the commutator is equivalent to the outer output end of the commutator; a method for setting respective components of the equidirectional transfer case and the actuator of the present invention is that a characteristic parameter is set to 0.8 to 1.25 when the equidirectional transfer case adopts the single-layer planetary gear train, the characteristic parameter is set to 1.6 to 2.5 when the equidirectional transfer case adopts the double-layer planetary gear train, the characteristic parameter of the single-layer planetary gear train of the actuator is set to 0.8 to 1.25, wherein the optimal setting is that the characteristic parameter is set to be equal to 1.0 when the equidirectional transfer case adopts the single-layer planetary gear train, the characteristic parameter is set to be equal to 2.0 when the equidirectional transfer case adopts the double-layer planetary gear train, and the characteristic parameter of the single-layer planetary gear train of the actuator is set to be equal to 1.0; according to the present invention, the power rotation speed input from the power source is converted to the power rotation speed of the output end of the actuator, and the input and output of the power rotation speed and the revolving speed input from the revolving control device do not interfere with each other; and according to the present invention, the output shaft is controlled to revolve around the actuator shaft by inputting the revolving speed, a forward revolving moment and a reverse revolving moment of the output shaft are controlled to be balanced, the output shaft has no unidirectional bearing moment, the revolving control device does not need to overcome the unidirectional bearing moment and thus the revolving control device has a simple structure.

2. The equidirectional transfer universal transmission according to claim 1, wherein when the equidirectional transfer case adopts a bevel gear single-layer planetary gear train, a planetary carrier is used as the input end of the equidirectional transfer case, and a left central gear, and a right central gear are respectively used as the inner output end of the equidirectional transfer case and the outer output end of the equidirectional transfer case.

3. The equidirectional transfer universal transmission according to claim 1, wherein when the equidirectional transfer case adopts a double-sun gear and double-planetary gear shaft planetary gear train, a planetary carrier is used as the input end of the equidirectional transfer case, and a left central gear and a right central gear are respectively used as the inner output end of the equidirectional transfer case and the outer output end of the equidirectional transfer case.

4. The equidirectional transfer universal transmission according to claim 1, wherein when the equidirectional transfer case adopts a cylindrical gear double-layer planetary gear train, a central gear with a large pitch circle diameter is used as the input end of the equidirectional transfer case, and a planetary carrier and a central gear with a small pitch circle diameter are respectively used as the inner output end of the equidirectional transfer case and the outer output end of the equidirectional transfer case.

5. The equidirectional transfer universal transmission according to claim 1, wherein when the equidirectional transfer case adopts a double-sun gear planetary gear train, a central gear with a larger pitch circle diameter is used as the input end of the equidirectional transfer case, and a planetary carrier and the other central gear are respectively used as the inner output end of the equidirectional transfer case and the outer output end of the equidirectional transfer case.

6. The equidirectional transfer universal transmission according to claim 1, wherein when the equidirectional transfer case adopts a double-inner gear ring planetary gear train, a central gear with a smaller pitch circle diameter is used as the input end of the equidirectional transfer case, and a planetary carrier and the other central gear are respectively used as the inner output end of the equidirectional transfer case and the outer output end of the equidirectional transfer case.

7. The equidirectional transfer universal transmission according to claim 1, wherein the commutator is the bevel gear planetary gear train commutator, the outer shaft adopts a bevel gear single-layer planetary gear train, the inner shaft of the quill shaft is provided with the inner input end and the inner output end, a left central gear and a right central gear of the bevel gear single-layer planetary gear train on the outer shaft of the quill shaft are used as the outer input end of the commutator and the outer output end of the commutator respectively, a bevel gear planetary gear is meshed with the left central gear and the right central gear to fix a planetary carrier, and a rotation direction of the outer input end of the commutator is opposite to a rotation direction of the outer output end of the commutator.

8. The equidirectional transfer universal transmission according to claim 1, wherein the commutator is the double-sun gear and double-planetary gear shaft planetary gear train commutator, the outer shaft adopts a double-sun gear and double-planetary gear shaft planetary gear train, the inner shaft of the quill shaft is provided with the inner input end and an outer output end, a left central gear and a right central gear of the double-sun gear and double-planetary gear shaft planetary gear train on the outer shaft of the quill shaft are used as the outer input end of the commutator and the outer output end of the commutator respectively to fix a planetary carrier, and a rotation direction of the outer input end of the commutator is opposite to a rotation direction of the outer output end of the commutator.

9. The equidirectional transfer universal transmission according to claim 1, wherein the commutator is the position-preserving two-way commutator, each of the inner shaft and the outer shaft is driven by a bevel gear pair, the inner input end and the outer input end of the position-preserving two-way commutator form an input quill shaft, the inner output end and the outer output end of the position-preserving two-way commutator form an output quill shaft, an input quill shaft bearing and an output quill shaft bearing are fixed separately, the input quill shaft and the output quill shaft form an included angle of 90 degrees, an inner driving bevel gear is disposed on the inner input end, an outer driving bevel gear is disposed on the outer input end, an inner driven bevel gear is disposed on the inner output end, and an outer driven bevel gear is disposed on the outer output end, so that the inner driving bevel gear is meshed with the inner driven bevel gear, and the outer driving bevel gear is meshed with the outer driven bevel gear, and if two rotation speeds in the same rotation direction are input on the inner input end and the outer input end, two rotation speeds in opposite rotation directions will be output on the inner output end and the outer output end.

10. The equidirectional transfer universal transmission according to claim 1, wherein the commutator is the position-changing two-way commutator, each of the inner shaft and the outer shaft is driven by a bevel gear pair, the inner input end and the outer input end of the position-changing two-way commutator form an input quill shaft, the inner output end and the outer output end form an output quill shaft, the input quill shaft and the output quill shaft form an included angle of 90 degrees, an inner driving bevel gear is disposed on the inner input end, an outer driving bevel gear is disposed on the outer input end, an inner driven bevel gear is disposed on the inner output end, and an outer driven bevel gear is disposed on the outer output end, so that the inner driving bevel gear is meshed with the outer driven bevel gear, the outer driving bevel gear is meshed with the inner driven bevel gear, and if two rotation speeds in the same rotation direction are input on the inner input end and the outer input end, two rotation speeds in opposite rotation directions will be output on the inner output end and the outer output end.

11. The equidirectional transfer universal transmission according to claim 1, wherein the commutator is the non-quill shaft commutator, the left transmission comprises a left input bevel gear, a left steering bevel gear, a left transmission bevel gear, and a left output bevel gear, the right transmission comprises a right input bevel gear, a right steering bevel gear, a right transmission bevel gear, and a right output bevel gear, the left input bevel gear is used as the left input end, the right input bevel gear is used as the right input end, the left output bevel gear is used as the left output end, and the right output bevel gear is used as the right output end; the left input bevel gear is meshed with the left steering bevel gear, the left steering bevel gear is directly connected to the left transmission bevel gear, the left transmission bevel gear is meshed with the left output bevel gear, the right input bevel gear is meshed with the right steering bevel gear, the right steering bevel gear is directly connected to the right transmission bevel gear, and the right transmission bevel gear is meshed with the right output bevel gear; and the transmission ratio of the left transmission is set to be equal to the negative value of the transmission ratio of the right transmission.

12. The equidirectional transfer universal transmission according to claim 1, wherein the actuator adopts a bevel gear single-layer planetary gear train, the left central gear is used as the outer input end of the actuator, the right central gear is used as the inner input end of the actuator, the planetary carrier is used as the revolving control end, one to six bevel gear planetary gears are used as the output end, the output shaft is gear shafts of these bevel gear planetary gears, and the output shaft and the actuator shaft form a turning angle of 90 degrees.

13. The equidirectional transfer universal transmission according to claim 1, wherein the actuator adopts a double-sun gear and double-planetary gear shaft planetary gear train, a left sun gear is used as the outer input end of the actuator, a right sun gear is used as the inner input end of the actuator, the planetary carrier is used as the revolving control end, the planetary gears are used as the output end, the output shaft is gear shafts of these planetary gears, and the output shaft and the actuator shaft are parallel to each other, i.e., form a turning angle of 0 degree.

* * * * *